July 24, 1973 M. S. WITHERS 3,748,214
CHANNEL STRUCTURE
Filed Aug. 16, 1971

INVENTOR
MICHAEL S. WITHERS

BY

ATTORNEY

United States Patent Office 3,748,214
Patented July 24, 1973

3,748,214
CHANNEL STRUCTURE
Michael Somerville Withers, Landenberg, Pa., assignor to E. I. du Pont de Nemours and Company, Wilmington, Del.
Filed Aug. 16, 1971, Ser. No. 171,856
Int. Cl. B32b 3/12
U.S. Cl. 161—122          1 Claim

ABSTRACT OF THE DISCLOSURE

Two surfaces of thermoplastic resin are heat bonded together by having one surface contain ribs which are contact-heated to the molten condition, followed by immediate lamination to the other surface. The contact-heating is done by passing the ribs along a hot bar at a high enough temperature above the melting point of the resin so that the resultant molten resin does not stick to the bar. One article made by this process is a laminate of two films having ribs extending therefrom heat-bonded rib-to-rib.

---

This invention is relates to heat bonding processes, and more particularly to a method for heat bonding surfaces of thermoplastic resin together and to a particular structure made thereby.

In order to heat bond (weld) surfaces of thermoplastic resin together, it is necessary to melt at least one of the surfaces sufficiently so that it will fuse to the other surface immediately brought into contact with it. When the heat to accomplish the melting is applied from a remote source, such as burner 20 to the tops of ribs of ribbed sheeting shown in FIG. 3 of U.S. Pat. 3,509,005 to Hartig, the uniformity of the heating is not adequate for precision work and an excessive area surrounding the surface to be melted becomes heated. The heating of the surrounding area tends to cause undesirable dimensional changes by virtue of the "memory" of the thermoplastic resin tending to change the resin to a different shape. In the case of oriented articles, such heating has the undesirable effect of destroying the orientation.

A method and apparatus for contact heating the tops of ribs of a ribbed structure of thermoplastic in order to melt them for lamination to a film, is disclosed in U.S. patent application Ser. No. 831,145, filed June 6, 1969, now abandoned by Withers (available as German patent publication 2,007,836), which has the effect of more uniformly heating the resin surface to be melted. This is accomplished by contacting the resin surface (tops of the ribs of the ribbed structure) with a heated release surface such as of polytetrafluoroethylene, with both the resin surface and release surface advancing or moving together at similar speeds along a path, followed by progressively peeling off or removing the molten resin surface from the release surface, and progressively contacting the molten surface with a film of thermoplastic resin. While this approach gives uniform melting and more localized heating than the Hartig burner, to thus produce a better heat bond and control of dimensions, this approach is not well adapted to heat bonding ribbed structures together rib-to-rib because the apparatus does not lend itself to precision guiding of the ribs to insure rib-to-rib alignment in the laminate. In addition, even though a polytetrafluoroethylene release surface is used, the speed of operation and pressure exerted by the surface on the thermoplastic resin must be carefully controlled to avoid peeling off the molten resin from the resin surface instead of the resin surface from the release surface.

The present invention involves a process for contact heating an article of thermoplastic resin using a stationary heating surface which has the advantages of even more localizing of the heating than present in the aforementioned Withers process, increased production rates, better guidance control for the article being subjected to the heating, and more simplified construction of equipment used. More specifically, the present invention is a process for heat bonding articles of thermoplastic resin together, comprising fabricating at least one of these articles to have at least one rib extending therefrom, advancing this article past a stationary heated surface which is in contact with the rib thereof to progressively melt the surface of the rib in contact with the heated surface as the article advances with respect to the heated surface, and progressively bringing another of said articles into contact with the molten surface of said rib to obtain heat bonding therewith. It is essential in the operation of this process for the temperature of the heated surface to be high enough above the melting temperature of the resin being melted that such resin does not stick to the heated surface. Molten resin is normally very sticky, especially to hot metal surfaces. Surprisingly, it has been found that by having the temperature of the heated surface hot enough, which temperature will vary with the conditions of the process and resin being melted, the molten resin does not stick to the heated surface.

The process of the present invention is especially applicable to making a channel structure of a pair of films spaced apart and interconnected by a plurality of ribs, by conducting the process wherein the thermoplastic articles are a pair of films each having a plurality of ribs extending therefrom and subjecting the ribs of each film to the contacting step, followed by progressively bringing the ribs of one film into cotnact with the ribs of the other film to obtain rib-to-rib heat bonding. The step to bring the ribs into contact with one another is usually accompanied by sufficient pressure to form a heat bond, the width of the area of which is at least 50% greater than the width of the ribs.

These and other embodiments of the present invention will be described in greater detail hereinafter with reference to the accompanying drawings in which.

Figure 1:
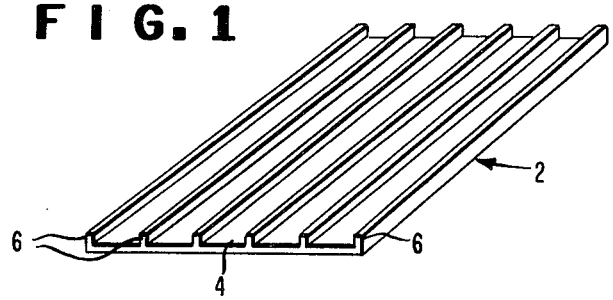
FIG. 1 is an isometric view of a ribbed structure of thermoplastic resin, one embodiment of article of thermoplastic resin that can be heat bonded in the process of the present invention.

The process of the present invention is conducted by at least one of the articles of thermoplastic resin having at least one rib extending therefrom which can be conveniently be provided in the original operation of fabricating the article. FIG. 1 illustrates one embodiment of article of thermoplastic resin, viz. a ribbed structure 2 comprising a film 4 having a plurality of spaced parallel ribs 6 of equal height integrally molded with and extending from the surface of the film. The ribbed structure can be made by the continuous molding process disclosed in U.S. Pat. No. 3,509,005 to Hartig which involves forming a web of thermoplastic resin on the surface of a molded rotating patterned roll, the web comprising a film and ribs extending from the surface of the film by virtue of the pattern in the roll.

Figure 2:
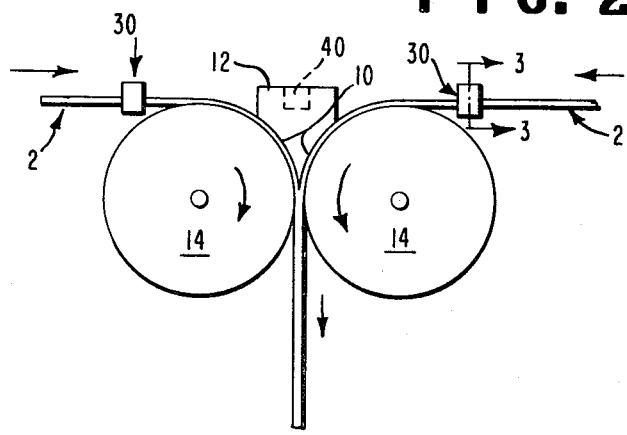
FIG. 2 shows schematically in side elevation one embodiment of apparatus for carrying out the process of the present invention.

In the process and apparatus depicted in FIG. 2, two ribbed structures 2 are being heat bonded together. This is done by advancing each ribbed structure, ribbed side up, in the direction shown by the arrows, past a pair of curved heating surfaces 10 of a heated cusp-shaped bar 12, with the ribs coming into contact with the surfaces 10 to obtain melting of the rib surfaces (tops of the ribs) in contact with the heated surface. Both ribbed structures then pass through the nip between a pair of driven rolls 14 which rotate at the same speed but in the opposite directions shown. In passing through the nip, the molten surfaces of the ribs of each of the ribbed structures progressively come into contact with one another to obtain rib-to-rib heat bonding.

Figure 4:
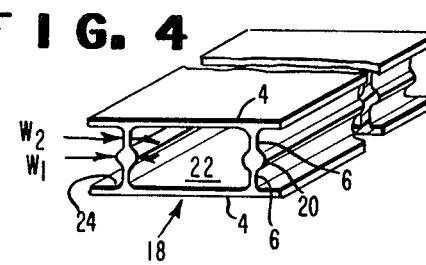
FIG. 4 shows a view in perspective of a portion of a channel structure showing the configuration of the heat bond made by laminating two ribbed structures of FIG. 1 together rib-to-rib.

The configuration of the resultant laminate or channel structure 18 is best shown in FIG. 4, wherein the area 20 of the heat bond between the ribs 6 is shown as a thickened region relative to the ribs 6. This thickened region, running intermediate the space between the pair of films 4 and along the length of the channel structure has a width $W_1$, which is preferably at least 50% greater than the width $W_2$ of the ribs making up the heat bond. This thickened region is a product of the pressure exerted by the bar 12 on the tops of the ribs and the spacing across the nip between rolls 14 relative to the starting height of the ribbed structures 2. The films 4, ribs 6, and areas 20 of heat bond cooperate to form channels 22 which run the length of the channel structure.

The dimensions of the film and rib components of the channel structure can be as desired, but such dimensions are advantageously as small as possible in order to provide lightness in weight and economy. Typical dimensions for the films 4 are from 1 to 20 mils thickness for each, with 1 to 12 mils thickness being preferred. The ribs provide stiffness to the films as well as serving the function of securing the films in a predetermined spaced-apart relationship. It generally suffices for the ribs to have a width of 1 to 20 mils and a spacing of 20 to 100 times the width $W_2$ of the ribs and a total height (distance between films) of at least 3 times the width $W_2$ of the ribs. It is also preferable for the bulk density of the channel structure to be less than 35% of the bulk density of the resin of which the channel structure is composed.

The channel structure 18 is useful for heat/mass transfer applications which can involve passing a first fluid through channels 22 and a second fluid of different temperature or mass condition between channel structures of a stack thereof to effect heat or ion-exchange between fluids. The channel structure 18 has the particular advantage over that which is made by the aforesaid Wither's process by having the joint between films 4 of the structure occur in the ribs rather than between ribs and film. While the Wither's process considerably alleviates the problem of stress risers occurring where a film is laminated to the tops of ribs, greater assurance of this effect is obtained in the channel structure of the present invention because smooth transition between rib and film can be obtained in the molding process such as by appropriately rounding the edges in the pattern in which the ribs are formed. For example, the junction 24 between ribs and film can be arcuate, having a radius of 5 to 10 mils, as shown in FIG. 4.

The avoidance of stress risers in the channel structure is important in applications, such as heat/mass transfer, wherein pressure within the channel structure exceeds external pressure. In applications not involving this pressure differential, the heat bonding process of the present invention can be used wherein one of the ribbed structures 2 of FIG. 2 is replaced by a film of thermoplastic resin, in which case contact with the heated bar 12 by such film would be unnecessary and could be avoided by using a heated bar having only a single curved surface 10 in contact with the ribs of the remaining ribbed structure.

Figure 3:
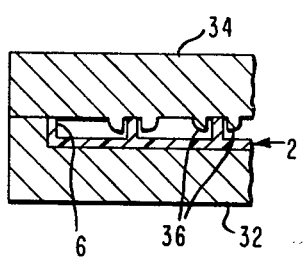
FIG. 3 shows in enlargement a part of the cross section taken along line 3—3 of FIG. 2.

In order for rib-to-rib alignment to occur in heat bonding the ribbed structures 2 shown in FIG. 2 together, some means for guidance and thus alignment of the ribs is required. The guidance means are shown as elements 30 in FIG. 2 and in greater detail in FIG. 3, as comprising a bottom channel plate 32 (only one side shown) which guides the edges of the ribbed structure 2 and a top plate 34 having depending pairs of bifurcated finger-like elements 36 which encompass and thereby guide the ribs 6. The elements 36 can be mounted on separate plates which are slidable with respect to each other so as to form adjustable spaces between the elements making up each pair thereof to accommodate different rib widths and achieve the best alignment possible. Of course, the elements 36 of one guidance means are aligned with the elements 36 of the other guidance means, whereby the ribs meet rib-to-rib at the nip between rolls 14. Since the heating surface does not move relative to the movement of the ribbed structure as in the Wither's process, the guidance means can be positioned close to the point of contact between the laminate components, i.e. the nip between rolls 14, making rib-to-rib heat bonding possible.

The heated bar 12 extends across the entire width of the articles being heat-bonded together, and in the embodiment shown in FIG. 2, across all of the ribs of the ribbed structure 2. The bar 12 is uniformly heated by an electric heating element 40 positioned in a well along the upper surface of the bar. The bar 12 rides freely on the tops of the ribs of the ribbed structures insuring contact heating and thus melting of all ribs passing thereunderneath, the weight of the bar on the ribs providing this assurance. The curved surfaces 10 of the bar which do the actual contacting of the rib tops serve to distribute the load of the bar and to provide for a heating time sufficient to obtain melting at high rates of travel of ribbed structure through the apparatus. The curved surfaces generally conform to the curvature of the rolls 14. Instead of the cusp-shaped bar 12 shown, a heated bar having a round cross section can be used, but only at lower production rates because of the relatively smaller area of contact between such bar and the tops of the ribs. The cusp-shaped bar 12 also has the advantage of providing heating almost to the nip where the molten resin surfaces come together and of providing considerable shielding of the molten resin from the atmosphere. For oxygen-degraded resins (when molten) the region surrounding the upper side of the nip is kept in an inert atmosphere, e.g. $N_2$. The heated bar can be made of any temperature-resistant, heat-conductive solid material. Aluminum-bronze alloy has demonstrated sufficient high temperature chemical and physical stability to be used as the material of construction of the heated bar.

The temperature of the heated bar is such that the molten resin from the thermoplastic article does not stick to the bar. If sticking occurred, the dimensions of the article reaching the nip between rolls 14 would vary giving poor product and the resin buildup on the heated bar would require periodic shutdown of production for removal of the buildup. While molten resin is known to stick to hot metal surfaces, it has been discovered as part of the present invention that sticking is avoided by increasing the temperature of the heated bar from a temperature above the melting point of the resin. For purposes of the present invention, the melting point of the thermoplastic resin can be considered as the minimum temperature at which a fresh sample of the resin leaves a molten trail as it is moved slowly across a heated metal surface. This is sometimes called the stick temperature. The particular temperature used will depend mainly on the resin being used. At the particular temperature which the resin does not stick to the bar, the rate at which the article travels past the bar is selected in accordance with the length of the contact surface so as not to excessively melt the article. For example, using a round cross section heating bar, a slow rate of travel, e.g. about 5 ft./min. by ribbed structure 2 gives satisfactory results, whereas the extended heating surfaces provided by the cusp-shaped bar enable operation to be speeded up to about 30 to 50 ft./min. Preferably, the temperature of the bar is at least 200° C. above the melting point of the resin. At the proper bar temperature, the bar can be moved sideways (along its axis) across the article whose ribs are being melted, this movement requiring such little effort as to suggest that interface between the bar and the ribs contains a gaseous or liquid lubricant.

Figure 5:
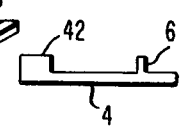
FIG. 5 shows an end view of another embodiment of ribbed structures that can be used in the process of the present invention.

Another embodiment of ribbed structure that can be heat bonded according to the process of the present invention is the ribbed structure of FIG. 1 having a thickened rib or bead 42 running along the edges (only one edge shown) of the ribbed structure as shown in FIG. 5. This thickened rib is slower melting than the thinner ribs 6, which means that the rib 42 serves to limit the pressure exerted by the heated bar 12 on the ribs 6 of the ribbed structure and the degree of compression of the ribbed structures at the nip between rolls 14.

Figure 6:
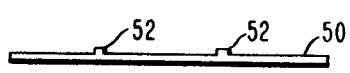
FIG. 6 shows an end view of still another embodiment of a ribbed structure that can be used in the process of the present invention.
Figure 7:
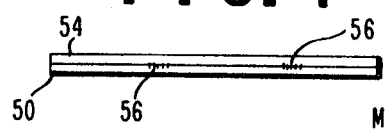
FIG. 7 shows an end view of a film heat bonded to the ribbed structure of FIG. 6.

In another embodiment as shown in FIG. 6, a film 50 has short, widely-spaced ribs 52 of equal height extending therefrom. These ribs serve the purpose of providing raised contact points for melting according to the process of the present invention, followed by lamination (heat bonding) to a film 54, as shown in FIG. 7. The lamination can be carried out by substituting film 50 rib-side-up for one of the ribbed structures 2 in FIG. 2 and the other ribbed structure by film 54 (and withholding contact heating of the film). The use of finger-like elements 36 for guidance supplied by channel plate 36 is sufficient to guide film 50. Pressure on the short molten ribs 52 at the nip between rolls 14 forces the films 50 and 54 virtually into contact, with the ribs being spread out laterally to form an area 56 of heat bond corresponding to the presence of the original ribs. In this embodiment, the ribs can be in any pattern desired, parallel or intersecting since retention of open channels between films may not be necessary for the ultimate use intended for the laminate. The resultant laminate can be used, e.g. for wrappng or packaging purposes in which the individual films supply different properties, e.g. grease resistance, permeability, adhesion, which in totality make an acceptable wrap.

As an example of the present invention using the embodiment shown in FIG. 2, in the case of polyethylene making up the ribbed structures 2, the tops of ribs 6 passing through their respective guide structures are contact heated at 450–500° C. by the cusp-shaped heated bar 12 at a film speed of about 50 ft./min. The films 4 of each ribbed structure each have a 5–10 mils radius molded between themselves and their respective ribs 6 and the films each have a thickness of 2 mils. The ribs 6 are 10 mils thick (wide) and 25 mils in height. The resultant channel structure 18 has an overall thickness of 48 mils after passing through the nip between rolls 14 and a thickened area 20 which is at least 50 percent wider ($W_1$) than the width ($W_2$) of the aligned ribs forming the thickened area. The rolls 14 are 4 inches in diameter and are water-cooled to cool the resultant channel structure and the melting done by the heated bar is done under a nitrogen atmosphere. The heated bar weighs 5 lbs. and its curved surfaces each have a length of 2 inches and the same curvature as the rolls 14. The bar is made of an aluminum-bronze alloy (Ampco).

The thermoplastic resin used to make the channel structure and other laminates made by the process of the present invention will depend on the application for which they are intended. Usually, but not necessarily, both the films of the channel structure will be made of the same resin, but this may not be true for other laminates such as that of FIG. 7.

Examples of thermoplastic resins include the saturated hydrocarbon polymers (polyolefins) such as linear or branched polyethylene, polypropylene and copolymers thereof; ionomers such as described in U.S. Pat. 3,264,272 to Rees; copolymers of ethylene with an $\alpha,\beta$-unsaturated carboxylic acid such as described in British Pat. 963,380 and blends thereof with saturated hydrocarbon polymers; polymers of halogenated or perhalogenated olefins such as vinyl chloride polymer and melt-fabricable tetrafluoroethylene copolymers such as tetrafluoroethylene/hexafluoropropylene, perfluoroalkylvinyl ether, or perfluorovinyl sulfonyl fluoride copolymers, and chlorotrifluoro ethylene polymers; polyvinyl acetate and copolymers thereof with saturated hydrocarbon polymers and, optionally, the acid copolymers of British Pat. 963,380; the polyamides such as polyhexamethylene adipamide (66 nylon), polyhexamethylene sebacamide (610 nylon), polycaprolactam (6 nylon), copolymers thereof and blends of the polyamides with acid copolymers, ionomers and/or saturated hydrocarbon polymers, oxymethylene polymers including homopolymers and copolymers; polycarbonate; ABS resin; polyesters such as polyethylene terephthalate; polysulfone; poly(phenylene) oxide; and chlorinated polyether.

As many apparently widely different embodiments of this invention may be made without departing from the spirit and scope thereof, it is to be understood that this invention is not limited to the specific embodiments thereof except as defined in the appended claim.

What is claimed is:

1. A channel structure comprising a pair of films, each said film having a plurality of parallel ribs extending therefrom, the ribs of one of said films being heat bonded to the ribs of the other of said films, the area of the heat bond having a width which is at least 50 percent greater than the width of said ribs, the ribs thereby dividing the resultant space between said pair of films into a plurality of channels.

References Cited

UNITED STATES PATENTS 3,274,315  9/1966  Kawamura _____ 264—177 X

WILLIAM A. POWELL, Primary Examiner

U.S. Cl. X.R.

156—242, 306, 583; 161—69, 123, 127, 139; 264—167, 248